US010628628B2

(12) United States Patent
Borders

(10) Patent No.: US 10,628,628 B2
(45) Date of Patent: Apr. 21, 2020

(54) METHOD, SYSTEM, AND COMPUTER PROGRAM PRODUCT FOR ARRANGING CONTENT IN A PLURALITY OF REGIONS TO OBTAIN A CONTENT-AWARE LAYOUT

(71) Applicant: COLLAGE.COM, INC., Brighton, MI (US)

(72) Inventor: Kevin R. Borders, Arlington, VA (US)

(73) Assignee: Collage.com, Inc., Brighton, MI (US)

( * ) Notice: Subject to any disclaimer, the term of this patent is extended or adjusted under 35 U.S.C. 154(b) by 69 days.

(21) Appl. No.: 15/158,663

(22) Filed: May 19, 2016

(65) Prior Publication Data
US 2017/0024362 A1 Jan. 26, 2017

Related U.S. Application Data

(60) Provisional application No. 62/196,348, filed on Jul. 24, 2015.

(51) Int. Cl.
*G06F 17/00* (2019.01)
*G06F 40/106* (2020.01)
*G06F 16/901* (2019.01)
*G06F 40/14* (2020.01)

(52) U.S. Cl.
CPC ........ *G06F 40/106* (2020.01); *G06F 16/9027* (2019.01); *G06F 40/14* (2020.01)

(58) Field of Classification Search
CPC .................................................. G06F 17/212
See application file for complete search history.

(56) References Cited

U.S. PATENT DOCUMENTS

| | | | |
|---|---|---|---|
| 7,743,322 B2 | 6/2010 | Atkins | |
| 8,065,627 B2 | 11/2011 | Atkins | |
| 8,976,198 B2 | 3/2015 | Borders et al. | |
| 9,275,479 B2 | 3/2016 | Borders et al. | |
| 2005/0071783 A1* | 3/2005 | Atkins | G06F 17/509 715/851 |
| 2007/0186154 A1* | 8/2007 | Anthony | G06F 17/30274 715/210 |
| 2009/0022424 A1* | 1/2009 | Chen | H04N 1/00132 382/284 |

(Continued)

OTHER PUBLICATIONS

<https://www.montagebook.com>; retrieved on May 19, 2016.

(Continued)

*Primary Examiner* — Scott T Baderman
*Assistant Examiner* — Barbara M Level
(74) *Attorney, Agent, or Firm* — Brooks Kushman P.C.

(57) ABSTRACT

A computer-implemented method, system and computer program product for arranging a plurality of objects or content into a plurality of regions to obtain a content-aware layout are provided. The method includes receiving region data which specifies properties for a plurality of regions and receiving object data which specifies properties for a plurality of objects. The method further includes processing the object and region data to produce an arrangement of the plurality of objects into the plurality of regions. The step of processing for at least one of the regions includes the steps of: generating a plurality of candidate object layouts, scoring the plurality of candidate object layouts, and selecting a layout from the candidate object layouts for the region based on the scores.

45 Claims, 5 Drawing Sheets

(56) References Cited

U.S. PATENT DOCUMENTS

| | | | | |
|---|---|---|---|---|
| 2010/0275152 A1* | 10/2010 | Atkins | .................. | G06F 17/212 |
| | | | | 715/788 |
| 2011/0029635 A1* | 2/2011 | Shkurko | ............... | G06F 17/248 |
| | | | | 709/217 |
| 2013/0294709 A1* | 11/2013 | Bogart | .................. | G06T 7/0022 |
| | | | | 382/284 |
| 2013/0298013 A1* | 11/2013 | Hunter | .................. | G06F 17/212 |
| | | | | 715/243 |
| 2015/0189107 A1* | 7/2015 | Murata | .................. | G06T 11/60 |
| | | | | 345/629 |

OTHER PUBLICATIONS

<http://heymosaic.com>; retrieved on May 19, 2016.
<https://www.shuttertly.com/photo-book-ipad-app/>; retrieved on May 19, 2016.

\* cited by examiner

METHOD, SYSTEM, AND COMPUTER PROGRAM PRODUCT FOR ARRANGING CONTENT IN A PLURALITY OF REGIONS TO OBTAIN A CONTENT-AWARE LAYOUT

CROSS-REFERENCE TO RELATED APPLICATIONS

This application claims the benefit of U.S. provisional patent application No. 62/196,348 filed Jul. 24, 2015.

TECHNICAL FIELD

This invention generally relates to methods, systems and computer program products for arranging content in a plurality of regions and, in particular, to methods, systems and computer program products which automatically arrange content, such as text and images, into multiple regions, such as pages in a multi-page object or distinct surfaces in a multi-object arrangement.

OVERVIEW

The following are referenced herein:
[atkins03a] C. Brian Atkins; Automatic photo album page layout. U.S. Pat. No. 7,743,322;
[atkins03b] C. Brian Atkins; Single pass automatic photo album page layout. U.S. Pat. No. 8,065,627;
[borders13] Kevin Borders et al. U.S. Pat. Nos. 9,275,479 and 8,976,198;
[montage] Interactive Memories, Inc. *Montage interactive web application*. https://www.montagebook.com; 2015;
[mosaic] Interactive Memories, Inc. *Mosiac mobile application*. http://heymosaic.com; 2015; and
[photostory] Shutterfly, Inc. *Shutterfly Photo Story for iPad*. https://www.shutterfly.com/photo-book-ipad-app/; 2015.

Multi-region content layout is an important and challenging problem for publishing and graphic design. Content, including text and images, must be carefully arranged to produce a desirable layout. There are many constraints and considerations that affect content layout. For example, text and images must be at least a minimum size such that a viewer can easily read the text or see the image content. Furthermore, large portions of images may have important content that should not be cropped, which constrains its aspect ratio inside the region. Text can have similar aspect ratio constraints based on desired line length and number of line breaks. Finally, the overall ordering and placement of content inside of regions may depend on the nature of content itself and relationships between pieces of content. For example, text content may describe particular image content and therefore needs to be placed adjacently in the same region, or the overall ordering of content may be chronological and, therefore, the content needs to be placed in a linear progression of regions, such as pages in a book.

These various content constraints, combined with constraints of the regions themselves, such as sizes of pages, make it difficult to produce a desirable layout for content inside of multiple regions. Previous methods typically employ fixed layouts for each region that are not content-aware. This means that the methods predetermine the layout of content on a page without any knowledge of what the content actually is—whether it be the aspect ratio and quantity of images, the content and form of text, or any other content attributes. As a result, prior automated content layout methods for multiple regions will place content in a manner that is visually unappealing, typically because the content is either cropped from its natural aspect ratio (thus cutting off important parts of the content), or arranged in a manner that leaves large open spaces in the region. Considering prior art, it is not obvious how to create a method and system for automatically generating a desirable layout of content in multiple regions.

There are a number of prior methods and systems for producing a layout of content objects into a plurality of regions. The first such type of method is employed by the Mosaic mobile application [mosaic]. It involves selecting one content object (an image) for each region (page) in the multi-region layout. Once the content has been selected, the software will insert one content object per region in the center of the region. While this method arguably creates a multi-region content layout, it does it in the most naïve and simplistic way possible. It does not pay any regard to the dimensions of the content (in this case, images) with respect to the region size. As a result, the visual quality of the resulting layout is very poor, with large gaps on the sides of images having an aspect ratio different than the page aspect ratio, and potentially blurry images if the original resolution is insufficient for clear printing at their size on the page.

Some slightly more advanced software programs—like Shutterfly Photo Story [photostory] and the Montage photo book web application [montage]—will generate a content layout for a plurality of regions having multiple content objects per region. However, this class of methods chooses a fixed pre-generated layout for each region. This type of fixed layout typically has one or more content slots. Each slot usually has a position and size, and can be filled with a content object. When a content object is placed into a slot, it is often cropped or downsized with gaps on two sides to fit into the slot. The slots may be different aspect ratios that are more suitable to content that has a similar aspect ratio.

This simplistic slot-based template method is very limited and often leads to undesirable layouts. Because the template is pre-generated without consideration of the actual content, if the content doesn't exactly match the expected content for the slot-based template, then the content may be cropped or have unsightly gaps. Furthermore, the number of slot-based templates available can severely limit how many content objects that can be placed on the page.

The methods described by Atkins for producing a layout in a single region are also limited compared to the methods described herein. The first method described by Atkins [atkins03a] outlines a method for evaluating multiple tree layouts based on a single property: the amount of unoccupied space in the region with respect to the generated layout. This is a simplistic one-dimensional measure of layout quality.

This method described by Atkins [atkins03a] also doesn't teach an effective way to generate trees. Atkins describes randomly assigning images to leaf nodes of a binary tree, and randomly selecting a horizontal or vertical cut/layout for branch nodes in that tree. While this method will generate a tree layout, the chances of it being desirable are very low because it is random. An effective method of intelligently and efficiently generating candidate tree structures for evaluation is not obvious. The method taught by Atkins [atkins03a] is inadequate in this regard.

Atkins also teaches a single-pass, tree-based, layout generation method [atkins03b]. This method involves iteratively inserting a content object (images) into a tree layout. This method further involves attempting to insert each new image at every node in the tree, scoring the result, and proceeding to the next iteration with the insertion that produced the best score. This method typically does not generate all possible tree layouts.

The prior art does teach various methods of generating a layout for a plurality of content objects inside of a single region. Atkins describes two different methods for layout generation of an album of photos [atkins03a, atkins03b]. Borders outlines a method for generating a layout of photos that resembles one or more shapes [borders13]. However, laying out content into multiple regions presents a number of major challenges without obvious solutions that are not present when dealing with a single region.

First of all, with a single region, the number of content objects to place in the region is pre-determined by user input. A multi-region layout method must determine how many content objects to place in each region to balance layout desirability across all of the regions. The obvious method for doing this—arbitrarily dividing up the content into groups of equal size for each region—leads to undesirable results. It may not be possible to generate a desirable layout for an arbitrary fixed group of content.

SUMMARY OF EXAMPLE EMBODIMENTS

An object of at least one embodiment of the present invention is to provide a method, system and computer program product for automatically arranging content in multiple regions. A goal of at least one embodiment of the invention is to aid in the layout of content, such as text and images, into multiple regions. These regions are most commonly distinct pages in a multi-page object, or distinct surfaces in a multi-object arrangement. By automatically determining many aspects of the multi-region layout, at least one embodiment of the invention helps a user to easily produce a layout that is visually desirable and satisfies constraints of the content and of the regions, such as sizes, positions, aspect ratios, and alignment.

At least one embodiment of the invention described herein provides a method, system, and computer program product for arranging content in a plurality of regions. An algorithm automatically arranges a plurality of content objects into a plurality of regions. The automatic layout algorithm employs a tree structure for each region to achieve a layout that closely satisfies constraints that produce a desirable content layout. The method for producing a layout with a fixed set of content inside of a single region has been partially described in prior art patents [atkins03a, atkins03b], and in [borders13]. However, the algorithm component of at least one embodiment of the present invention is producing an assignment of a plurality of content objects into a plurality of regions such that: (1) the content layouts are all desirable, (2) each of the content objects is included in a region, and (3) each of the regions contains content in a desirable layout. Properly assigning content a specified set of content to a particular number of regions or a range of numbers of regions in a manner that satisfies all of these three constraints is not obvious based on a method for producing a desirable layout within one region given a fixed set of content, and at least one embodiment of the current invention employs novel and non-obvious techniques to achieve these goals.

At least one embodiment of the invention creates an intelligent layout with multiple content objects per region using a sophisticated method for producing region layouts.

In contrast to a slot-based template layout, at least one embodiment of the invention uses a dynamic tree-based layout for each region. This provides maximum flexibility for arranging any number of content objects of arbitrary dimensions into a region of arbitrary dimensions. This flexibility makes it much easier to generate a professional-looking layout with content closely fitting the region with only negligible gaps or cropping and provides substantial advantages over previous work.

At least one embodiment of the invention provides a more advanced method whereby a variable number of content objects are placed into each region such that a layout of those content objects closely matches desired properties of the region (e.g., aspect ratio). It further teaches a two-pass minimal/target fitting method where a limited number of content objects are inserted into a minimum number of regions to produce layouts for the regions such that each meets a minimum level of desirability. This allows the at least one embodiment of the invention to produce higher-quality layouts with fewer images per region.

At least one embodiment of the invention describes a number of additional quality measures for a layout, including the relative size of objects, the position of objects, and the absolute size of objects. Weighting multiple properties together into a score leads to a layout that is much more desirable. Conversely, using a simple uncovered-space metric may lead to highly undesirable layouts (e.g., with some objects being much too small or large).

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Generating a Layout for a Single Region

Objects

One goal of at least one embodiment of the method, system, and computer program product described herein is to arrange content into a plurality of regions. The unit of content that the invention arranges is an object. An object can represent an image, text, or any other content. Each object has a rectangular bounding box that largely encapsulates the content. The algorithms described here will position and scale objects based on their bounding boxes. Each object may have a single fixed aspect ratio (the ratio of height to width). It may also have a range of aspect ratios that are acceptable (e.g., allowing an image to be cropped or skewed to some degree, or for a text area to have different height:width ratios).

A key property of objects is their ability to scale up or down in size while maintaining the aspect ratio constraints. The methods described in the sections that follow may apply a scale to one or more objects to produce a desirable layout. However, objects may also have constraints on the degree to which they should be scaled with respect to their containing region. For example, if an image has an original source resolution of 800×600 pixels, that image object may have a constraint that it is undesirable to scale to larger than 2× its original size (1600×1200 pixels) or smaller than half its size (400×300 pixels) when being placed into a region of a given pixel size. When a layout is being produced for the object, the scoring method described later may assess a penalty so that the layout generation algorithm will avoid scaling the image object beyond its desired size.

Objects may also have desired locations with respect to their containing regions. For example, if it is desirable for a particular object to appear in the lower-right corner of a layout for whatever reason, this preference may be expressed by evaluating the position of the object relative to its desired position during the scoring procedure described later.

Tree Structure and Layout Computation

Figure 1:
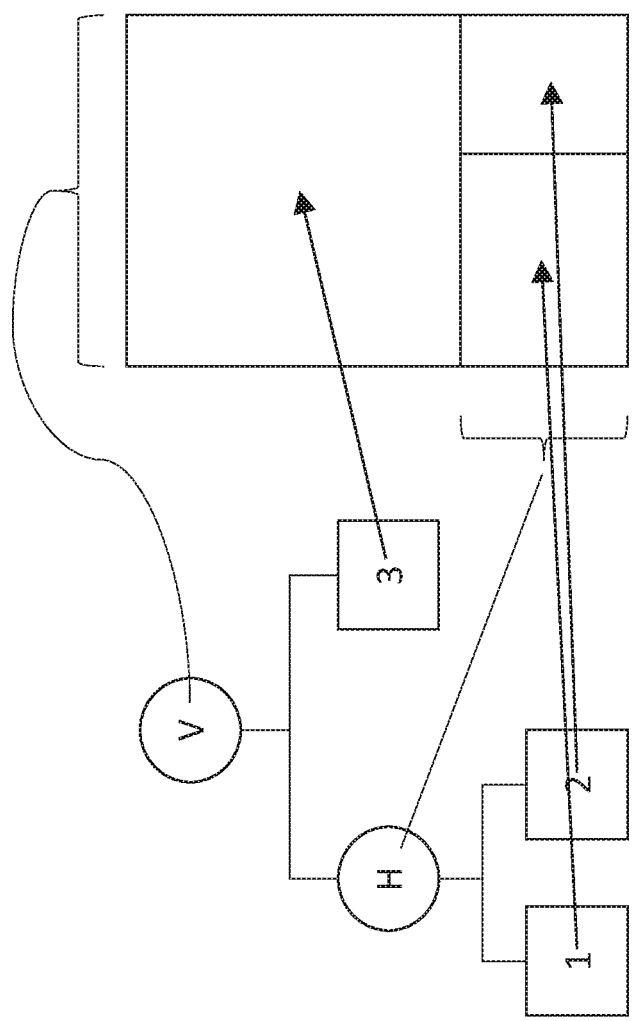
FIG. 1 shows a tree structure representing a layout of multiple content objects in a region, as well as the corresponding layout for that tree structure with arrows indicating which areas of the layout correspond to which nodes in the tree; H and V indicate that these nodes have their children arranged horizontally or vertically.

The basis for at least one embodiment of the invention described herein is a tree structure containing objects, and a method for producing a layout of those objects in a two-dimensional space based on the tree structure. FIG. 1 illustrates how this tree structure works. Each leaf node in the tree (nodes 1, 2, and 3 in the figure) represents an object. Sibling nodes are scaled such that they either have the same height (if the parent node specifies a horizontal layout, as indicated by parent node H in the figure) or the same width (if the parent node specifies a vertical layout, as indicated by parent node V in the figure). Then, they are arranged adjacent to one another to form the area covered by the parent node.

Once a tree structure has been created as shown in FIG. 1, the process for computing the node layout is as follows. Iterate through the nodes in the tree, starting with the lowest-level leaf nodes and working back up to the root of the tree. For each parent node, calculate the range of possible aspect ratios of the parent node bounding box by either:

1. If layout is vertical, adding the lowest aspect ratios (height:width), and then adding the highest aspect ratios (height:width) of all the child nodes together to determine the low/high aspect ratio values of the parent node aspect ratio range.

2. If the layout is vertical, add the inverse of the lowest and highest aspect ratios (width:height) of all the child nodes together, and then take the inverse of the lowest and highest values and reverse them to determine the low/high height:width aspect ratio range of the parent node.

Once the aspect ratio range of the entire tree's bounding box has been determined (which could be a single value if all of the objects have a fixed aspect ratio instead of a range), the next step is to set an absolute size and position of the whole tree based in some coordinate space. (It can be pixels, points, or any other units. This invention does not depend on any particular coordinate space.) This will depend on the size and desired covering of the region. Two common ways to fill a region are to completely cover it and allow parts of objects to fall outside the region, or to completely contain the layout inside of the region so that no objects fall outside. At this point, the exact aspect ratio should also be determined. The most common way to do this is to choose a value in the allowable range that is closest to the aspect ratio of the region so that the layout fits the layout of the region as closely as possible.

To illustrate this positioning, if the tree is meant to fit completely inside of a 1000×1000 pixel region, be centered with respect to the center of the region, exactly touch two of the sides, and have a height:width aspect ratio of exactly 4:3, then the upper-left corner of the tree should be at coordinate [125, 0] and the lower-right corner should be at [875, 1000]. (This assumes a y-negative coordinate space like the one used by web browsers. The remainder of the examples will assume a y-negative coordinate space. In a y-positive coordinate space the y-values would be flipped).

After the overall tree's position and size has been determined, the final step in producing a layout is to iterate top-down through the tree and assign positions and sizes to each of the individual nodes. If there is a range of aspect ratios {A, B} for the tree and an actual chosen aspect ratio C between A and B, then let the constant k be equal to (C−A)/(B−A). Starting at the root node and given the starting point (e.g., [125, 0]) and ending point (e.g., [875, 1000]) or size (e.g., [750, 1000]), for each child node:

1. Set the fixed dimension:
  a. If the node layout is vertical, then set the child width to be the input width for the current parent node, and the child x-value to be the parent node x-value.
  b. If the node layout is horizontal, then set the child height to be the input height for the current parent node, and the child y-value to be the parent y-value.

2. If using an aspect ratio range, pass the constant value k to the child to set its aspect ratio. If the child's aspect ratio range is {X, Y}, then set its aspect ratio to X+(Y−X)*k.

3. Set a current position variable P to the left position (for horizontal) or top position (for vertical in a y-negative coordinate space) of the current parent node. Then, for each child node:
  a. Set its left/top position to P and the opposite-dimension position/size based on the fixed values in step 1.
  b. Compute the remaining width (if horizontal) or height (if vertical) value V of the node and assign the all four values [left, top, width, height] to the child node.
  c. Add value V to the current position P and continue back to (a) for the next node until all the nodes have been visited.

4. For each child node, either proceed back to step 1 if it is a branch node, or output its position and size if it is a leaf node.

Once the above algorithm is complete, it will output a size and position for each object (represented by a leaf node) in the tree. These object bounding boxes will collectively fill the originally specified area of the root node of the tree, even though branch nodes have no direct manifestation in the final output.

Generating Candidate Tree Structures

The procedure described in the previous section can generate a layout for a given object tree structure. However, it does not proscribe a method for efficiently generating a desirable tree structure in the first place, which is a much more difficult and non-obvious problem due to the exponential number of possible tree structures for a tree with n leaf nodes—O(nn). Even if it is computationally feasible to try every possible tree structure (for low values of n), it is also not obvious how to create a procedure for selecting and evaluating candidate trees that leads to the most visually desirable tree, because there are different competing attributes that affect desirability in various ways. This section describes methods for generating candidate trees. (A method for scoring and choosing the best one is discussed later.)

Inserting a Node into a Tree

Figure 2:
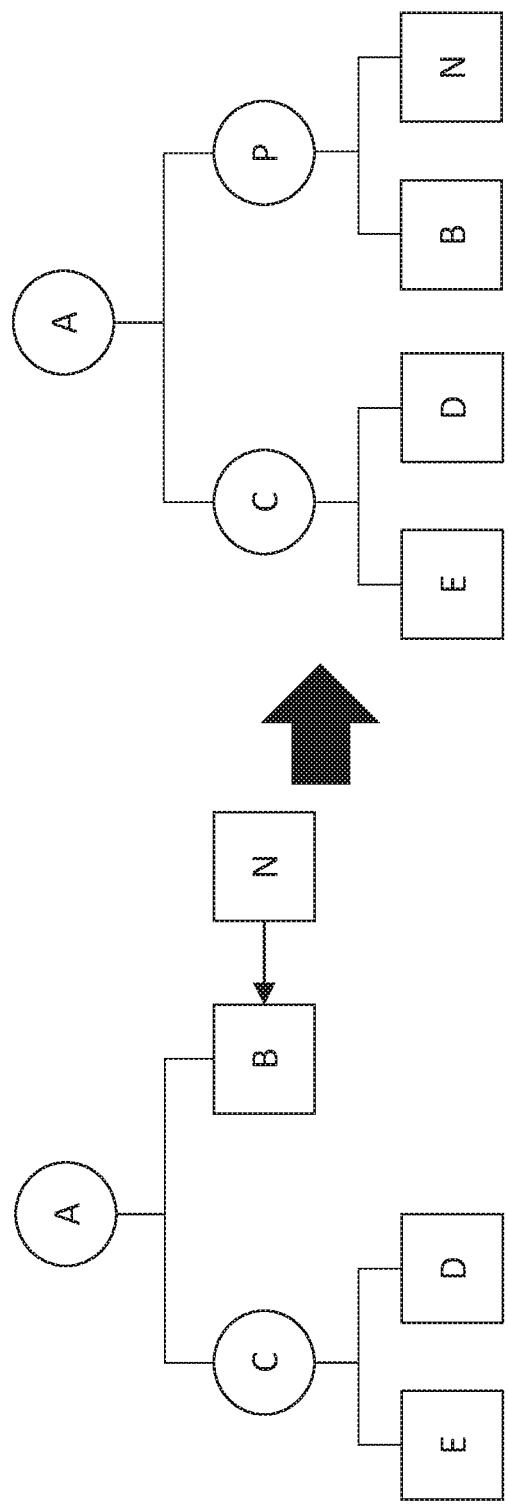
FIG. 2 illustrates the node insert process where a node N is inserted into an existing layout at node B; new parent node P is created with B and N as children, which replaced B in the layout.

All of the generation methods described here will iteratively insert object leaf nodes into a tree until all of the input objects have been inserted. Inserting the very first node when the tree is empty entails making that node the one and only root node. After that, given an existing tree, a new object leaf node to insert N, and an existing node B (which could be a branch or leaf node) at which to insert the new node, inserting a node involves creating a new parent branch node P for nodes N and B, and then setting P's parent to existing node B's original parent. This process is illustrated in FIG. 2. The left illustration shows the tree before, and the right illustration shows the tree after inserting node N at node B by replacing B with a new branch node B, and making B and N children of P.

When this insertion happens, it is necessary to make two additional choices beyond the insertion node (B in FIG. 2). First, the new parent branch node must be assigned a layout direction—either horizontal (H) or vertical (V). This will impact whether the two child nodes will be arranged horizontally from left to right, or vertically from top to bottom. Second, the relative order of the new node N and existing node B can be specified such that either N or B comes first in the layout (on the left or top). The node order only affects the node position and has no impact on the node size or overall layout aspect ratio (the horizontal/vertical layout direction does), so the generation algorithm may just choose one node ordering if the node position is not a parameter referenced by the scoring procedure.

Flattening Binary Trees

Repeatedly applying the insertion method described in the previous section will lead to a binary tree—one where each branch node has exactly two children. In this tree, branch nodes may have a child that is another branch node with the same layout direction. This structure is equivalent to a non-binary tree in which the child branch node with the same layout is removed and its children are added to the original parent, creating a tree where some branch nodes have three or more children, making the tree non-binary. This flattening operation may be done at any time, and the methods described here do not require the layout tree to be a binary tree.

Brute Force Insertion Method

The first method of generating candidate tree structures from a given set of objects is to produce every possible tree structure. This involves iteratively inserting each new object at every possible position into the current tree with both possible layouts (horizontal or vertical) for the newly created parent node, and, optionally, both orderings of the newly inserted node with respect to its sibling (in FIG. 2, B before N or N before B). This procedure, which is called BRUTE_FORCE_INSERT, involves inserting the first object O as the root of the tree T, and then proceeding with each subsequent object O as follows:

1. Given the next object leaf node O to insert into the tree T, visit every node A (both branch and leaf nodes) in T:
    a. Insert O as a sibling of A with new parent P having a horizontal layout to produce a new tree T2 and ordering [A, O].
       i. Recursively proceed back to step 1 for the next node, or GENERATE the current tree if the number of objects in it are within the range of objects to use for the tree (between MIN_OBJECTS and MAX_OBJECTS, described later).
    b. Insert O as a sibling of A with new parent P having a vertical layout to produce a new tree T3 and ordering [A, O].
       i. Recursively proceed back to step 1 for the next node, or GENERATE the current tree if the number of objects in it are within the range of objects to use for the tree (between MIN_OBJECTS and MAX_OBJECTS, described later).
    c. Optionally, if node position matters, repeat steps (a) and (b) to produce and recurse with new trees T4 and T5 having the reverse ordering [O, A].

Note that this algorithm provides a way to generate trees with varying numbers of objects. This is discussed more in the later section that describes a region layout procedure for a variable number of objects.

Selective Insertion Method

The method described in the previous section has exponential time complexity of O(nn). This means it gets to be very expensive (generating a large number of trees) very quickly as n—the number of objects—increases. As such, it may be necessary to have a method for constructing candidate trees for larger node counts that selectively explores the space of possible tree layouts in a more efficient way. Luckily, having more objects and more potential layouts also means that there are more options for generating a layout that satisfies the original constraints and is thus desirable.

The general approach for selectively inserting nodes into a tree is to choose a particular location at which to insert each node that maintains properties of the layout at desirable levels. Two common important layout properties are the overall layout aspect ratio (for fitting the layout into a region of a given aspect ratio), and the relative size of object leaf nodes with respect to one another (so that no nodes end up substantially larger or smaller than the other nodes in the layout). An example of a SELECTIVE_INSERT procedure that tries to maintain both overall aspect ratio fit and relative leaf node size is as follows. Note that this specific choice of criteria is meant to be illustrative and not limiting; other criteria may be used to select the insertion point (such as its position) if there are other desirable properties to maintain during SELECTIVE_INSERT:

1. Given the next object leaf node O to insert into tree T, locate the leaf node A such that A has the largest relative size (either total area, width, or height) of any leaf node in the tree T, then:

a. Insert O as a sibling of A with new parent P having ordering [A, O] to create a new tree T2.
b. If the original aspect ratio of T (or the middle of the aspect ratio range) is less than the aspect target aspect ratio for the region (i.e., height:width is less), then set the layout of P to vertical (thus increasing the aspect ratio of T2), otherwise set it to horizontal.
c. If the number of objects in the tree is within the range of objects to use (describe later, between MIN_OBJECTS and MAX_OBJECTS), then GENERATE the tree.
d. Recursively proceed back to step 1 for the next node, or if there are less than BRUTE_FORCE_THRESHOLD nodes remaining, proceed using step 1 of BRUTE_FORCE_INSERT, or if no objects remain, stop.

Notice that for the final insertion iterations, it can be effective to switch from SELECTIVE_INSERT back to BRUTE_FORCE_INSERT. This is because the SELECTIVE_INSERT algorithm will try fewer possible layouts. So, while the method described above will always approach the target aspect ratio, it may end up slightly above or below it in the final iteration. Trying more possibilities in the last BRUTE_FORCE_THRESHOLD iterations increases the likelihood of ending up with a layout that exactly matches the target aspect ratio. For a large number of objects, it is desirable to set BRUTE_FORCE_THRESHOLD to a small value like 2. This is because the cost of each BRUTE_FORCE_INSERT iteration is higher, and because the layout produced by SELECTIVE_INSERT will be closer to the target properties in the first place on account of each iteration having a smaller impact on them (by inserting objects that are relatively smaller compared to the whole layout). For a smaller number of objects, using a higher BRUTE_FORCE_THRESHOLD (e.g., 3, 4, 5) can increase the chances of finding a good layout without being too slow because each BRUTE_FORCE_INSERT iteration requires visiting fewer nodes. Below a certain number of objects (typically 5-8, depending on available computing resources), it is usually desirable to just use BRUTE_FORCE_INSERT for all nodes.

If there are other properties that are desirable to maintain, such as the positions of one or more objects in the layout, then the selective insert algorithm can be adjusted in step 1 to select an insertion node based on a weighted scoring of possible insertion points. The method described above effectively just uses a one-dimensional score of the node's relative size and chooses the largest node. If accounting for position, the node selection process can be updated to use a weighted combination of the relative node size and the distance of the center of the new node after insertion from its desired position. The weighting can be done, for example, by multiplying the two numbers together, and then choosing the option with the lowest weight. At least one embodiment of the invention does not depend on the particular method for weighting the selection parameters, so long as it leads to selection choices that cause the SELECTIVE_INSERT method to produce a tree layout that approaches the desired parameters.

Post-Processing

When using the SELECTIVE_INSERT method for constructing a tree layout, there are times when the result does not exhibit desired properties very well. In particular, objects that are inserted into the tree at the beginning of the process are more likely to get moved around and resized repeatedly, thus drifting away from target sizes or positions. Because SELECTIVE_INSERT just picks a single insert point at each step without trying a large number of options, it can be impossible to reach a desirable layout by applying the BRUTE_FORCE_INSERT method at only the last few steps.

One way to mitigate these limitations of the SELECTIVE_INSERT procedure is to perform a post-processing method at the end of the procedure. The post-processing method for a finished tree T involves the following steps:

1. Search for object leaf nodes that have undesirable properties in the tree layout T. (E.g., their relative sizes are too small, they are a long distance from their desired location, etc.) For each node A with undesirable properties:
   a. Remove node A from its parent node P. If the parent node P now only has one child B, then also remove P and replace it with B. This creates an intermediate tree layout T2 with node A removed.
   b. Re-insert node A into a tree layout T2 using an iteration of the SELECTIVE_INSERT method, which will find a new location at which to insert A and produce a new tree layout T3.
   c. Continue to step 1 until no nodes remain with undesirable properties, or until a maximum iteration limit has occurred (to prevent an infinite loop if this method doesn't arrive at a layout where no nodes have undesirable properties).
2. Optionally, at the end, randomly remove BRUTE_FORCE_THRESHOLD leaf nodes from the layout using the method described in (1.a) and re-apply the BRUTE_FORCE_INSERT procedure for the remaining nodes. This will increase the likelihood of a layout that more closely matches desired properties, such as overall aspect ratio.

Efficiently Re-Calculating Tree Properties

The methods described above involve inserting nodes to generate new tree layouts. The most naïve and inefficient way to do this to completely copy the tree data structure and visit every node to recompute the aspect ratio, size, and position of every node at each step. However, this would make execution take much longer, and involves unnecessary copying and computation. There are a few methods for performing these operations that increase overall efficiency.

The first optimization is caching the computed aspect ratios for each node in the tree. A node's aspect ratio will not change unless one of the nodes below it changes. When inserting a new node N into the tree, it is only necessary to recompute the aspect ratio of each parent node of N going up to the root, which will be approximately log 2(m) computations where m is the total number of nodes in the tree, instead of m operations to recompute the aspect ratio of every node. This makes it much faster to determine the aspect ratio of a tree T following an insertion. (The aspect ratio may be needed to score the tree T in the scoring procedure.)

Another optimization is caching the relative size of the largest and smallest leaf nodes underneath a branch node. Similarly, this will not change unless a node underneath the branch node changes. This again makes the overhead of recomputing the largest and smallest size of nodes in the tree following an insertion log 2(m). Furthermore, it reduces the time to search for the largest node in the tree—an operation used in step 1 of SELECTIVE_INSERT—from m to log 2(m).

Finally, it is desirable to avoid copying tree structures whenever possible, because this involves visiting every node in the tree, and using up more memory for the copied tree. So, the methods above can be optimized such that every operation that produces a new logical tree layout T2 will in fact modify the current tree layout T in place—for example, inserting a new node into the tree. Because future iterations of the methods described above may require modifying tree T again, they can undo the operations that were applied in-place to modify T to be T2 (e.g., by removing an inserted node) and continue execution. If it's necessary to save a tree layout because the scoring procedure indicates that it has the best score of any layout so far, then the whole layout can be copied and saved for later. Because this is infrequent, however, it reduces the overhead per iteration for the above procedures to essentially just the cost of modifying the tree-layout in-place. Combined with the other two optimizations above, the effective cost per generated tree is O(log 2(m)) where m is the current size of the tree instead of O(m) in the naïve implementation.

Scoring Candidate Tree Structures

The methods described in the previous section teach a method for generating candidate tree structures with desirable values of properties (like aspect ratio, the ratio of the largest to smallest leaf node, etc.). This section provides a procedure for scoring a generated tree layout to determine if it is more desirable than other layouts. The way that these methods typically work together is that the scoring procedure is applied to each tree as it is generated. If the score for a tree is the best observed score so far, then that layout is copied and saved along with its score, replacing the previous best layout. Once all layout possibilities have been generated and scored, the layout with the best score will remain.

The SCORE procedure itself is designed to consider the values of a plurality of layout properties, and produce a scalar output score that makes it possible to select one tree with a better score than another. Without a scoring function, it would be unclear how to select one layout with a better property value along one dimension (e.g., aspect ratio), but a worse property value along another (e.g., ratio of smallest to largest node). The exact scoring procedure that is used is not integral to the proper functioning of this invention. The only requirement is that it produces a score that makes comparison of two trees possible, and that the score generally indicates a more desirable layout.

One effective implementation of a scoring procedure is to take the product of one or more penalty values $>=1$. A penalty of 1 indicates that the property has a fully desirable value and should not penalize the current layout. Any value greater than 1 indicates that there is a degree of undesirability for the current property value and another tree with a lower penalty would be favorable. For example, if one goal is to match a target aspect ratio R, then an effective way to compute a penalty score based on the layout aspect ratio S is to divide the greater of S and R by the other value, producing a normalized ratio $Q>=1$ of the actual aspect ratio to the target aspect ratio. Furthermore, it may be more undesirable the further Q is from 1 (a close match may be just fine visually, but a large difference could create a more unsightly gap), so one way to account for this is to exponentiate the difference, making the final score $Q^n$ where n is a constant value (e.g., 4).

Similarly for other properties, one way to generate a penalty score $>=1$ is to divide the larger of the target and the actual value by the other value, and exponentiate the result by a constant value depending on how undesirable it is to have larger values. In cases where a small deviation of threshold is completely acceptable (e.g., the distance of a node from its target location), the penalty score can be MAX(actual−target−threshold+1, 1) n so that differences less than threshold do not incur any penalty.

Finally, once a plurality of penalty scores have been assessed for all of the properties of the tree under consideration, they can all be multiplied together to produce a final penalty score $P>=1$. Then, the SCORE procedure can output this value, and it can be used to select the most desirable layout by choosing the layout with the best (lowest) value.

Region Layout Procedure for a Fixed or a Variable Number of Objects

The procedures described in the previous sections provide methods for generating and scoring tree layouts. These procedures can be used to produce the most desirable layout for a fixed number of objects, or for a variable number of objects. The idea behind using a variable number of objects is that it will provide greater flexibility and lead to more desirable layouts when adding content to multiple regions; by using a number of objects that produces the best layout in one region, unused objects can be placed into other regions.

For practical purposes, it is also helpful to employ a score threshold STOP_SCORE when generating layouts. If a layout is found with a better score than STOP_SCORE, then execution can halt, and that layout can be returned instead of running until it finds the best possible option. This helps to reduce the average execution time required to find a suitable result, because the procedure will stop running if it finds a layout with a good enough score, even if a slightly better layout exists.

The final procedure REGION_LAYOUT ties together the procedures described in the earlier section to produce a desirable tree layout with between MIN_OBJECTS and MAX_OBJECTS objects in the layout.

1. Determine BRUTE_FORCE_THRESHOLD—the number of iterations for which to use the BRUTE_FORCE_INSERT method at the end—based on MAX_OBJECTS.
2. While (MAX_OBJECT—number of used objects) <BRUTE_FORCE_THRESHOLD, apply SELECTIVE_INSERT. Then, apply BRUTE_FORCE_INSERT for the final iterations. For each generated layout L:
   a. Apply SCORE(L) to compute the score of the layout S. If the score S is the best score seen so far, then save S and L as Sbest and Lbest.
   b. If S is better than STOP_SCORE, then stop the layout generation loop.
3. After generating all of the layout possibilities or reaching STOP_SCORE, output the best score and layout Sbest and Lbest. This layout will use a number of objects between MIN_OBJECTS and MAX_OBJECTS.

Generating a Layout for Multiple Regions

The previous section described how to generate a single desirable tree layout for one or more content objects. This section utilizes the REGION_LAYOUT procedure from the previous section to generate a plurality of layouts that cover a plurality of regions.

There are many potential applications of the methods described herein, but two popular applications are designing a book, and designing a calendar. In the scenario of a book, the regions are pages, and the book may have a minimum and maximum number of desirable pages (MIN_REGIONS and MAX_REGIONS). The minimum number of pages for a book can be based on physical constraints if the book is being printed onto paper. Similarly, the maximum number of pages can be set based on practical considerations for printing. An example of MIN_REGIONS and MAX_REGIONS for a book might be 20 and 200.

Conventional calendars have a fixed number of content regions that are opposite each calendar grid area. As a result, they require a fixed number of regions—12 in the case of a 12-month calendar (plus 1 or 2 if content is placed on the front or back of the calendar). In this case, MIN_MIN_RE- GIONS and MAX_REGIONS may both be the same (e.g., 12), indicating that the multi-region layout procedure described here should generate layouts for exactly 12 regions.

In the case of a book or a calendar, it is typical for the pages to be the same size, but this need not be the case. If regions are not all the same, the methods described here can use a region parameter specification function REGION_PARAMS(region number) to provide parameters for each region based on its number. These parameters may include the region size in some unit space, a region aspect ratio, or a range of potential sizes/aspect ratios. It also may include a size and position of the region if the region is a sub-region of a larger region (for example, having multiple regions for multiple layouts at different places on a single page). The region parameters may also contain any other settings that will impact the behavior of the REGION_LAYOUT procedure for the given region, including values of STOP_SCORE, or weight constants to use in the SCORE procedure (for example, if image size ratios are more important than aspect ratios for the region, e.g., due to its absolute physical size).

One thing to note about the methods described in this section is that they preserve the order of objects with respect to the ordering of regions. This means that no object B that occurs after object A in the input list will be placed in an earlier region. Later objects may only be placed in the same region or later regions than earlier objects. This property is desirable, for example, when laying out content in a book that has an inherent chronological ordering. If this property is not desired, then the methods described here can randomize the object input list at the beginning. In this way, ordering is an optional and not a limiting feature.

Multi-Region Layout Procedure

Given a queue of objects OQUEUE with which to create between MIN_REGIONS and MAX_REGIONS layouts, a method MULTI_LAYOUT for producing those layouts is as follows:

1. Iterate at least MIN_REGIONS times, and then continue iterating up to MAX_REGIONS times while objects remain in OQUEUE. For each iteration:
   a. Compute region parameters R for the current region by using the function REGION_PARAMS(iteration number).
   b. Compute CURMIN—the current minimum number of objects from OQUEUE to use in the region layout.
      i. (The method for doing this will depend on the operating mode of the procedure.)
   c. Compute CURMAX—the current maximum number of objects from OQUEUE to use in the region layout.
      i. (The method for doing this will depend on the operating mode of the procedure.)
   d. Execute procedure REGION_LAYOUT with region parameters R, queue of objects OQUEUE, object minimum CURMIN, and object maximum CURMAX to produce a desirable layout L for the current region.
   e. Remove the objects in L from OQUEUE.
   f. Append the layout L to an output list OLIST.
2. Output the list of regions OLIST.

This MULTI_LAYOUT method will repeatedly apply the REGION_LAYOUT procedure to produce desirable layouts for each region. The key challenge in this method is choosing suitable values for CURMIN and CURMAX that use an appropriate number of objects and also provide enough flexibility to generate desirable layouts.

A simple implementation of CURMIN and CURMAX computation is to make both values equal to the number of remaining objects in OQUEUE divided by the number of remaining regions to be filled to reach MIN_REGIONS (either rounded up or down—the last iteration will use all the remaining objects). This will use all of the objects in the queue and spread them evenly over MIN_REGIONS. This approach is effective for situations with a fixed number of regions (i.e., MIN_REGIONS and MAX_REGIONS are the same), like calendars. However, it does not provide an effective way to produce content layouts with a variable number of regions because it does not afford the REGION_LAYOUT procedure any flexibility with regard to using a variable number of objects to produce the best layout for an individual region.

Minimal Layout Generation

Another way to compute the CURMIN and CURMAX values in the MULTI_LAYOUT procedure is to set CURMIN to 1 or some other low number such that each call to REGION_LAYOUT will use the fewest number of objects that it can to produce a desirable layout. This should be coupled with loosening STOP_SCORE or the weighting parameters of the SCORE procedure so that they will stop and choose layouts having this minimum number of objects if they meet other parameters of acceptability (e.g., aspect ratio). CURMIN, CURMAX can be set to an arbitrary maximum number of objects to use in each region for the minimal layout, or a lower number based on the number of remaining objects in OQUEUE and the number of remaining regions to be filled to reach MIN_REGIONS.

Figure 3:
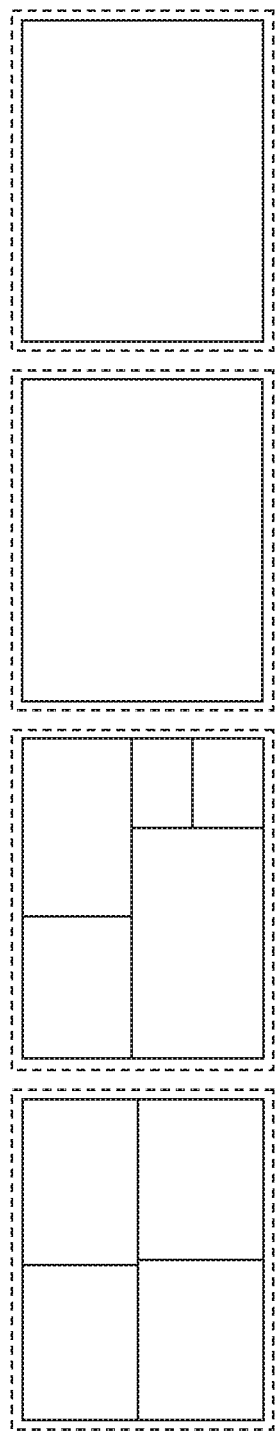
FIG. 3 shows a layout of multiple content objects into four different regions; this shows a minimal layout where fewer content objects (in this case 1) may be inserted into a region if those objects have an aspect ratio closely matching the region.

This approach will ensure that the layout for each region satisfies constraints to some extent while using as few objects as possible. It is particularly effective at ensuring an aspect ratio match between each layout and its region within some threshold determined by STOP_SCORE. For example, if a single object from OQUEUE has an aspect ratio close to that of the region, then it can just use one object for a region layout. However, if the OQUEUE objects have a much different aspect ratio, then REGION_LAYOUT may use more of them to produce a layout that fits the region. FIG. 3 shows an example of a minimal layout for four regions where two of the regions contain a single object, while the other two require multiple objects (four and five) to closely match their aspect ratio because the original object aspect ratios are substantially different from those of the regions. (In this figure, there is some padding between the edges of the layout and the edge of each page/region, which is denoted by a dotted line.)

This minimal layout generation approach is effective if the number of available objects is small, but it is not ideal in the general case because layouts with only one or a few objects may be undesirable compared to layouts with more objects. For example, in FIG. 3, the layouts on the left side with four and five objects are visually preferable to just placing a single object in a region. However, if all regions where assigned a larger number of objects from the outset, then the MULTI_LAYOUT procedure could run out of extra objects and be forced to revert to layouts with only one object that do not match other region parameters (e.g., aspect ratio) very well. The goal of the minimal layout approach is to trade off some degree of layout desirability in earlier iterations so that more objects are available in later iterations to produce more desirable layouts at that point. This is helpful when there are a limited number of objects in OQUEUE relative to MIN_REGIONS.

Target Layout Generation

In the normal mode of operation for the MULTI_LAYOUT procedure, the STOP_SCORE and weight parameters of the SCORE algorithm should be set to give preference to overall layout desirability irrespective of accepting layouts with fewer objects. As such, it may also be appropriate to set a default value of CURMIN to a higher number like 3 or 4 to prevent layouts with fewer objects altogether. Alternatively, the SCORE procedure could be configured to assess a large penalty to layouts with fewer objects, which would effectively lead to choosing layouts with more objects unless they are very undesirable in some other way.

For TARGET mode layout generation, CURMAX should ideally be set to some number at least a few objects greater than CURMIN to allow flexibility in REGION_LAYOUT choosing an appropriate number of objects to produce a better layout.

If there are not enough available objects to fill the remaining regions, then CURMIN and CURMAX may be reduced to ensure that each region has at least one or a few objects available for its layout.

Figure 4:
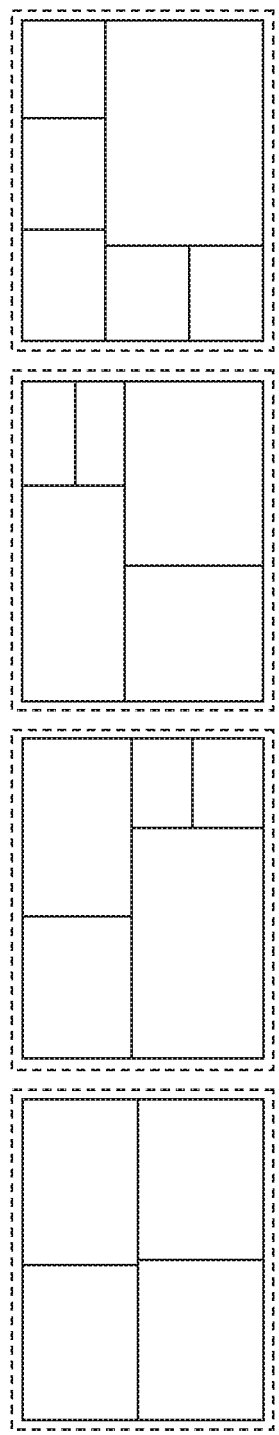
FIG. 4 shows a layout of multiple content objects into four different regions; unlike FIG. 3, the layout in this figure uses more content objects per region to produce an ideal target layout that prefers using more than a few images per region.

FIG. 4 shows the result of TARGET layout generation. Notice compared to FIG. 3 that some region layouts may end up being the same as in a minimal layout generation if the minimal layout is the same as the ideal target layout (the left two regions in FIG. 3 and FIG. 4). But, it may produce layouts having more content objects for regions where a minimal layout generation method chose a less desirable layout having fewer objects (the right two regions in FIG. 3 and FIG. 4).

Multi-Pass Generation

It may not be easy to tell whether there are enough content objects to fill up MIN_REGIONS to a desirable level using a simple heuristic like the number of objects per region. So, one approach for getting the best possible layout in all regions is to execute MULTI_LAYOUT in a MINIMAL layout generation mode in reverse order. Then, if there are objects left over after filling MIN_REGIONS, perform another pass over the same regions again with MULTI_LAYOUT in a TARGET layout generation mode. The steps for doing this are as follows:

1. Reverse the order of objects in OQUEUE, so that the last object will be placed first, and the first object will be placed last.
2. Iterate from back to front for MIN_REGIONS iterations using the MULTI_LAYOUT procedure generating a layout for the last region with objects from the front of the reversed OQUEUE first, and the first region last.
3. If no objects remain, then they were all consumed during MULTI_LAYOUT in MINIMAL mode.
   a. In this case, STOP and output the list of region layouts
4. Reverse the objects that remain in OQUEUE so that the first object is at the start of OQUEUE again.
5. Iterate through MIN_REGIONS starting with the first region. For each region:
   a. Remove the objects from the layout generated during the MINIMAL first pass, and add them back to the end of OQUEUE. This step is illustrated in the left side of FIG. 5.
   b. Using the objects that remain in OQUEUE, execute an iteration of MULTI_LAYOUT in the TARGET mode to use the deal number of objects for the region. This step is illustrated in the right side of FIG. 5.
6. If any objects remain in OQUEUE after filling MIN_REGIONS in TARGET layout generation mode, then proceed with adding new regions up to MAX_REGIONS (or when OQUEUE is empty, whichever happens first) and adding objects to them in TARGET layout generation mode.

The method described above will use the TARGET mode of MULTI_LAYOUT on as many regions as possible, but also ensure that all of the MIN_REGIONS at least have a layout from the MINIMAL mode of MULTI_LAYOUT. This is better than the naïve single-pass implementation described in the previous section, which would just fill up the remaining regions with the absolute minimum number of objects each (e.g., 1 object) and produce undesirable layouts after running out of objects. Doing multiple passes leads to layouts that at least meet a minimum level of desirability.

Figure 5:
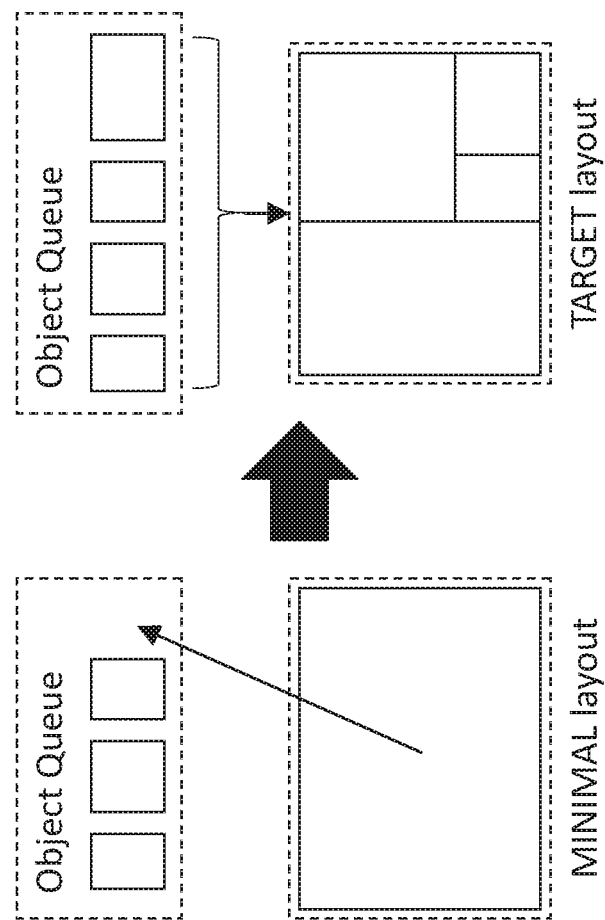
FIG. 5 shows the process of removing a content object from a region having a minimal layout, adding it to the back of the object queue, and generating a new TARGET layout for the region using all the objects in the object queue; in a multi-pass procedure, this is how initial minimal layouts are converted to target layouts.

FIG. 5 illustrates an iteration of this multi-pass procedure where the object(s) from the initial MINIMAL pass are re-added to the end of OQUEUE, and then the region layout is re-generated using an ITERATION of the MULTI_LAYOUT procedure in TARGET, which produces a more desirable layout having more objects.

Advantages of at Least One Embodiment of the Invention

The BRUTE_FORCE_INSERT and SELECTIVE_INSERT methods described herein generate candidate tree structures much more effectively that the prior art methods.

The single-pass method outlined by Atkins is somewhat similar to the SELECTIVE_INSERT method described in the present invention, which is designed for larger numbers of content objects where using BRUTE_FORCE_INSERT for all of the objects is too expensive. However, the SELECTIVE_INSERT method described here has a number of substantial advantages over Atkins' single-pass method. First, single-pass requires visiting every node in the tree, and then computing the score that would result from inserting a new node at that point. Altogether, the overhead of this operation would be at least $O(m*\log(m))$ to visit m nodes and then compute a score for each.

Instead, SELECTIVE_INSERT searches for a single insertion point, which can just be the largest node. If properties are effectively cached, then this search process only requires visiting $O(\log(m))$ nodes. Then, it inserts the new object at that point and proceeds to the next iteration of the procedure. The overhead of this method is also only $O(\log(m))$.

Finally, the SELECTIVE_INSERT method described herein has an advantage over single-pass in that it can use BRUTE_FORCE_INSERT for the final iterations of the procedure, thus trying out more possibilities during the critical final iterations to achieve a result that has the best score possible. Because single-pass only inserts one object at a time, it does not explore as many possibilities and so is less likely to produce as good of a layout.

Both U.S. Pat. Nos. 8,976,198 and 9,275,479 disclose hardware in FIG. 10 (and corresponding text) and FIG. 18 (and corresponding text), respectively, upon which at least one embodiment of the present invention may be implemented. The disclosures of these two patents are hereby incorporated in their entirety by reference herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method, implemented by a computing device having at least one processor, of flexibly arranging a plurality of objects into a plurality of regions to obtain a content-aware layout, the method comprising:

receiving, via an input device, object data which specifies properties for a plurality of objects;

receiving, via an input device, parameter data which specifies a minimum quantity of regions, the minimum quantity being at least two;

arranging the object data into a list of objects to be inserted into a plurality of regions; and processing, via the at least one processor, the object and region quantity data to produce a flexible arrangement of the plurality of objects into a plurality of regions having a quantity at least equal to the minimum quantity and at most equal to the maximum quantity, wherein the step of processing for at least one of the regions comprises the steps of:

determining minimal layout generation parameters that comprise a minimum number of objects to add to the region, a maximum number of objects to add to the region, and a minimum layout score;

determining target layout generation parameters that comprise a minimum number of objects to add to the region, a maximum number objects to add to the region, and a minimum layout score, with at least one of the minimum number of objects, maximum number of objects, or minimum layout score being different than the minimal layout generation parameters;

processing the object data with the minimal layout generation parameters for the minimum quantity of regions to produce a minimal object layout for each region and a list of at least one remaining object that is not present in any of the object layouts;

processing the minimal object layouts and the list of at least one remaining object, the step of processing comprising the following iterative steps for at least one minimal object layout;

adding the objects from the minimal object layout back to the object list and processing the object list using the target layout generation parameters to product a target obiect layout for that region;

wherein the step of processing object data with both the minimal or target layout generation parameters comprises the steps of:

determining a minimum and maximum number of objects to add to the region, the determining based on a number of objects remaining in the list, the number of the regions previously filled, the minimum quantity of regions from the parameter data, and the minimum and maximum number of objects parameters;

generating a plurality of candidate object sets from the list of objects containing quantities of objects between the determined minimum and maximum number of objects;

generating at least one candidate object layout for a plurality of candidate object sets, the generating including iteratively inserting objects into a tree structure having node data, and iteratively computing the aspect ratio of parent nodes based on aligning and scaling their respective child notes horizontally having the same height or vertically having the same width;

scoring the plurality of candidate object layouts to obtain a score for each of the layouts, the scoring including comparing the aspect ratio of the root tree node to the aspect ratio of the region;

selecting one of the layouts from the candidate object layouts for the region based on the scores and the minimum score parameter; and removing the set of objects in the selected layout from the list of objects to be inserted into the remaining regions.

2. The method as claimed in claim 1, wherein the step of inserting includes producing every possible tree structure for a given set of objects for two or more iterations.

3. The method as claimed in claim 1, wherein the step of inserting includes a selective insertion method for one or more iterations.

4. The method as claimed in claim 1, further including a post-processing step performed following the step of inserting to produce a more desirable layout.

5. The method as claimed in claim 1, wherein at least a subset of the node data is stored in computer memory between iterations to reduce computational overhead.

6. The method as claimed in claim 1, wherein the step of scoring includes computing a value based on a combination of a plurality of layout property measurements inclusive of aspect ratio and ratio of the largest to the smallest leaf node.

7. The method as claimed in claim 1, wherein the step of generating includes generating layouts that have different numbers of objects.

8. The method as claimed in claim 1, wherein the step of generating is ended when the score of a generated layout reaches a threshold.

9. The method as claimed in claim 1, wherein the received region data specifies a minimum or maximum number of regions.

10. The method as claimed in claim 1, wherein the step of processing for at least one of the regions further includes the step of specifying a minimum or maximum number of objects to include in the region.

11. The method as claimed in claim 1, wherein the step of processing the object and region data further includes adding objects to a region layout that are in a queue, and removing those objects from the queue after they are added to the region layout.

12. The method as claimed in claim 1, wherein thresholds and parameters for the steps of generating, scoring, and selecting a layout are set to favor layouts with a small number of photos.

13. The method as claimed in claim 1, wherein thresholds and parameters for the steps of generating, scoring, and selecting a layout are set to favor layouts that closely satisfy predetermined desirability constraints.

14. The method as claimed in claim 1, wherein the step of processing the object and region data is performed in multiple passes such that the steps of scoring and selecting are performed a plurality of times for at least one region using different parameters and thresholds.

15. The method as claimed in claim 14, wherein the parameters and thresholds used in one pass favor layouts including fewer objects in a region, and the parameters and thresholds used in another pass favor layouts that closely satisfy desirability constraints.

16. A system having a processor for flexibly arranging a plurality of objects into a plurality of regions to obtain a content-aware layout, the system comprising:

means for receiving object data which specifies properties for a plurality of objects;

means for receiving parameter data which specifies a minimum quantity of regions, the minimum quantity being at least two; and at least one processor to arrange the object data into a list of objects to be inserted into a plurality of regions and process the object and region data to produce a flexible arrangement of the plurality of objects into a plurality of regions having a quantity at least equal to the minimum quantity and at most equal to the maximum quantity, wherein, for at least one of the regions, the at least one processor:

determines minimal layout generation parameters that comprise a minimum number of objects to add to the region, a maximum number of objects to add to the region, and a minimum layout score;

determines target layout generation parameters that comprise a minimum number of objects to add to the region, a maximum number objects to add to the region, and a minimum layout score, with at least one of the minimum number of objects, maximum number of objects, or minimum layout score being different than the minimal layout generation parameters;

processes the object data with the minimal layout generation parameters for the minimum quantity of regions to produce a minimal object layout for each region and a list of at least one remaining object that is not present in any of the object layouts;

processes the minimal object layouts and the list of at least one remaining object, the step of processing comprising the following iterative steps for at least one minimal object layout;

adds the objects from the minimal object layout back to the object list and processing the object list using the target layout generation parameters to product a target object layout for that region;

wherein the processing of the object data with both the minimal or target layout generation parameters includes where the at least processor:

determines a minimum and maximum number of objects to add to the region, the determination based on a number of objects remaining in the list, the number of the regions previously filled, the minimum quantity of regions from the parameter data, and the minimum and maximum number of objects parameters;

generates a plurality of candidate object sets from the list of objects containing quantities of objects between the determined minimum and maximum number of objects;

generates at least one candidate object layout for a plurality of candidate object sets, the generating including iteratively inserting objects into a tree structure having node data, and iteratively computing the aspect ratio of parent nodes based on aligning and scaling their respective child notes horizontally having the same height or vertically having the same width;

scores the plurality of candidate object layouts to obtain a score for each of the layouts, the scoring including comparing the aspect ratio of the root tree node to the aspect ratio of the region;

selects one of the layouts from the candidate object layouts for the region based on the scores and the minimum score parameter; and removes the set of objects in the selected layout from the list of objects to be inserted in the remaining regions.

17. The system as claimed in claim 16, wherein the at least one processor produces every possible tree structure for a given set of objects for two or more iterations.

18. The system as claimed in claim 16, wherein the at least one processor inserts by a selective insertion method for one or more iterations.

19. The system as claimed in claim 16, wherein the at least one processor performs a post-processing step after inserting to produce a more desirable layout.

20. The system as claimed in claim 16, further comprising computer memory to store a subset of the node data between iterations to reduce computational overhead.

21. The system as claimed in claim 16, wherein the at least one processor scores by computing a value based on a combination of a plurality of layout property measurements inclusive of aspect ratio and ratio of the largest to the smallest leaf node.

22. The system as claimed in claim 16, wherein the at least one processor generates by generating layouts that have different numbers of objects.

23. The system as claimed in claim 16, wherein the at least one processor ends generating when the score of a generated layout reaches a threshold.

24. The system as claimed in claim 16, wherein the received region data specifies a minimum or maximum number of regions.

25. The system as claimed in claim 16, wherein the at least one processor processes for at least one of the regions by specifying a minimum or maximum number of objects to include in the region.

26. The system as claimed in claim 16, wherein the at least one processor processes the object and region data by adding objects to a region layout that are in a queue, and removing those objects from the queue after they are added to the region layout.

27. The system as claimed in claim 16, wherein thresholds and parameters for generating, scoring, and selecting a layout are set by the at least one processor to favor layouts with a smaller number of photos relative to other layouts.

28. The system as claimed in claim 16, wherein thresholds and parameters for generating, scoring, and selecting a layout are set by the processor to favor layouts that closely satisfy predetermined desirability constraints.

29. The system as claimed in claim 16, wherein the at least one processor processes the object and region data in multiple passes such that scoring and selecting are performed a plurality of times for at least one region using different parameters and thresholds.

30. The system as claimed in claim 29, wherein the parameters and thresholds used by the at least one processor in one pass favor layouts including relatively fewer objects in a region, and the parameters and thresholds used by the at least one processor in another pass favor layouts that closely satisfy predetermined desirability constraints.

31. A computer-readable, non-transitory storage medium that stores a set of instructions including instructions which, when executed by one or more processors, cause the one or more processors to perform the steps comprising:

receiving object data which specifies properties for a plurality of objects;

receiving parameter data which specifies a minimum quantity of regions, the minimum quantity being at least two;

flexibly arranging the object data into a list of objects to be inserted into a plurality of regions; and processing the object and region quantity data to produce an arrangement of the plurality of objects into a plurality of regions having a quantity at least equal to the minimum quantity and at most equal to the maximum quantity, wherein the step of processing for at least one of the regions comprises the steps of:

determining minimal layout generation parameters that comprise a minimum number of objects to add to the region, a maximum number of objects to add to the region, and a minimum layout score;

determining target layout generation parameters that comprise a minimum number of objects to add to the region, a maximum number objects to add to the region, and a minimum layout score, with at least one of the minimum number of objects, maximum number of objects, or minimum layout score being different than the minimal layout generation parameters;

processing the object data with the minimal layout generation parameters for the minimum quantity of regions to produce a minimal object layout for each region and a list of at least one remaining object that is not present in any of the object layouts;

processing the minimal object layouts and the list of at least one remaining object, the step of processing comprising the following iterative steps for at least one minimal object layout;

adding the objects from the minimal object layout back to the object list and processing the object list using the target layout generation parameters to produce a target object layout for that region;

wherein the step of processing object data with both the minimal or target layout generation parameters comprises the steps of:

determining a minimum and maximum number of objects to add to the region, the determining based on a number of objects remaining in the list, the number of the regions previously filled, the minimum quantity of regions from the parameter data, and the minimum and maximum number of objects parameters;

generating a plurality of candidate object layouts for a plurality of candidate object sets, each of the plurality of candidate object sets being generated from the list of objects and containing quantities of objects between the determined minimum and maximum number of objects, the generating including iteratively inserting objects into a tree structure having node data, and iteratively computing the aspect ratio of parent nodes based on aligning and scaling their respective child notes horizontally having the same height or vertically having the same width;

scoring the plurality of candidate object layouts to obtain a score for each of the layouts, the scoring including comparing the aspect ratio of the root tree node to the aspect ratio of the region;

selecting one of the layouts from the candidate object layouts for the region based on the scores and the minimum score parameter; and removing the set of objects in the selected layout from the list of objects to be inserted in the remaining regions.

32. The medium as claimed in claim 31, wherein the step of inserting includes producing every possible tree structure for a given set of objects for two or more iterations.

33. The medium as claimed in claim 31, wherein the step of inserting includes a selective insertion method for one or more iterations.

34. The medium as claimed in claim 31, wherein the one or more processors perform a post-processing step following the step of inserting to produce a more desirable layout.

35. The medium as claimed in claim 31, wherein at least a subset of the node data is stored in computer memory between iterations to reduce computational overhead.

36. The medium as claimed in claim 31, wherein the step of scoring includes computing a value based on a combination of a plurality of layout property measurements inclusive of aspect ratio and ratio of the largest to the smallest leaf node.

37. The medium as claimed in claim 31, wherein the step of generating includes generating layouts that have different numbers of objects.

38. The medium as claimed in claim 31, wherein the step of generating is ended when the score of a generated layout reaches a threshold.

39. The medium as claimed in claim 31, wherein the received region data specifies a minimum or maximum number of regions.

40. The medium as claimed in claim 31, wherein the step of processing for at least one of the regions further includes the step of specifying a minimum or maximum number of objects to include in the region.

41. The medium as claimed in claim 31, wherein the step of processing the object and region data further includes adding objects to a region layout that are in a queue, and removing those objects from the queue after they are added to the region layout.

42. The medium as claimed in claim 31, wherein thresholds and parameters for the steps of generating, scoring, and selecting a layout are set to favor layouts with a small number of photos relative to other layouts.

43. The medium as claimed in claim 31, wherein thresholds and parameters for the steps of generating, scoring, and selecting a layout are set to favor layouts that closely satisfy predetermined desirability constraints.

44. The medium as claimed in claim 31, wherein the step of processing the object and region data is performed in multiple passes such that the steps of scoring and selecting are performed a plurality of times for at least one region using different parameters and thresholds.

45. The medium as claimed in claim 44, wherein the parameters and thresholds used in one pass favor layouts including fewer objects in a region, and the parameters and thresholds used in another pass favor layouts that closely satisfy desirability constraints.

* * * * *